Figure 1:
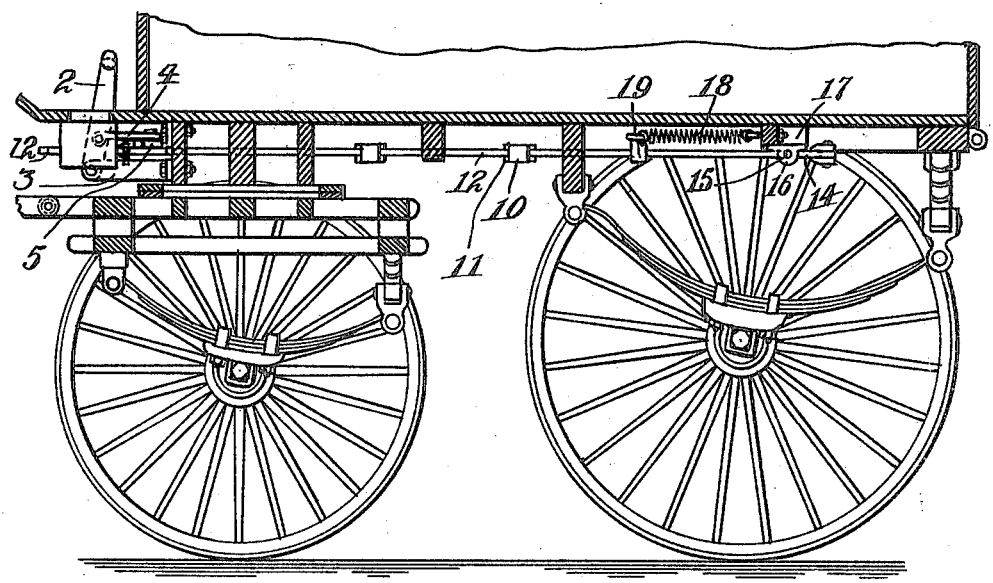

M. SHERMAN & B. RIVKIN.
BRAKE FOR VEHICLES.
APPLICATION FILED NOV. 14, 1913.

1,196,724.

Patented Aug. 29, 1916.
3 SHEETS—SHEET 1.

Witnesses:
O. Hinsman
J. R. Mattingly

Inventors:
Moses Sherman,
Bert Rivkin,
By their Attorney Albertus B. Mattingly

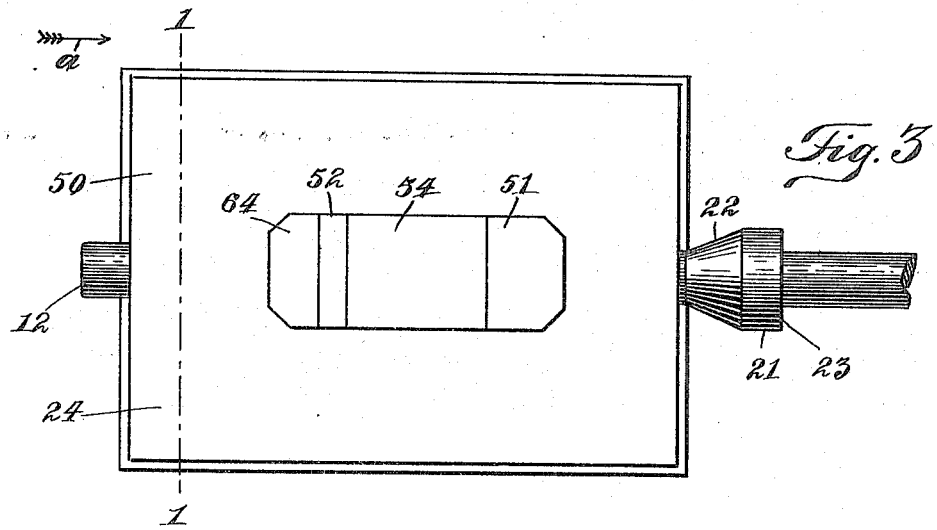
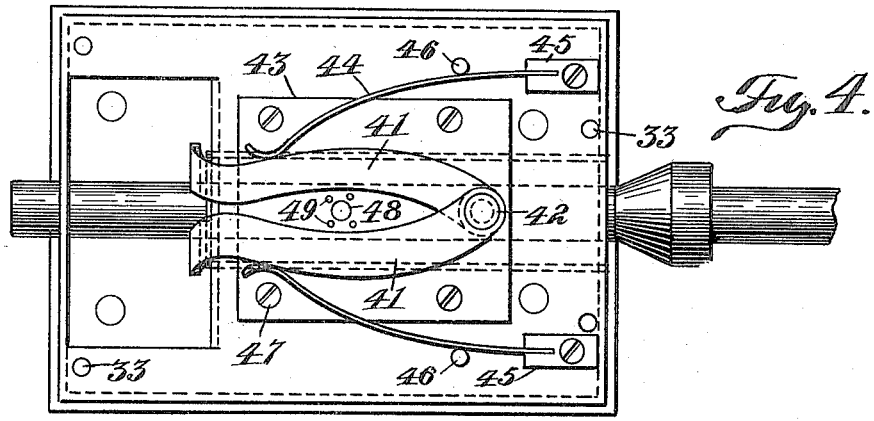
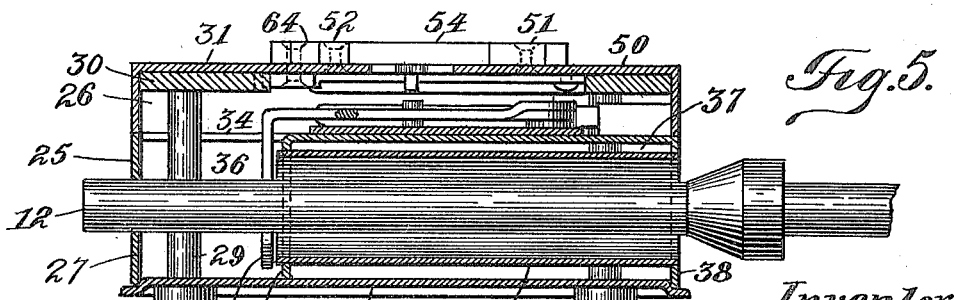

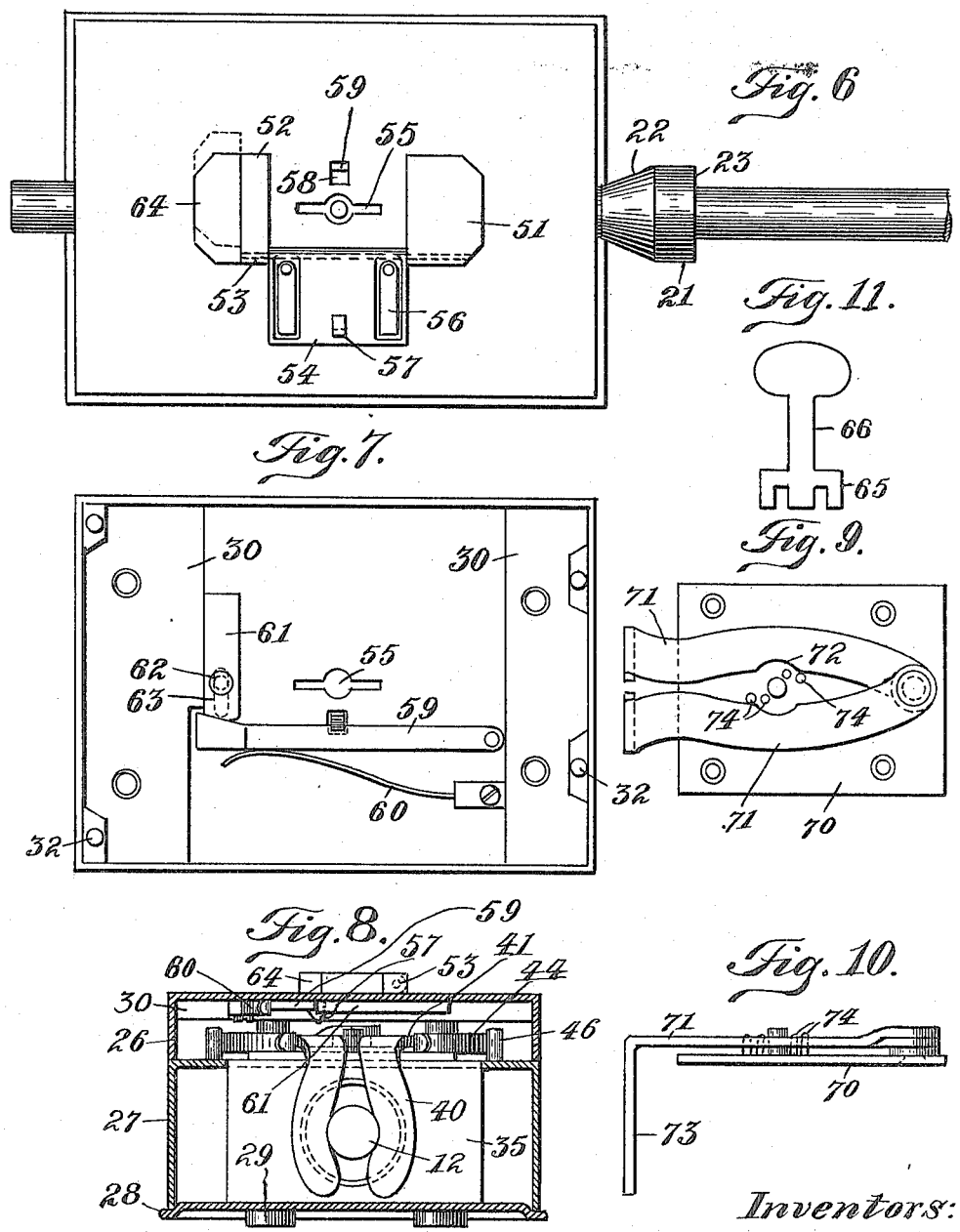

UNITED STATES PATENT OFFICE.

MOSES SHERMAN AND BERT RIVKIN, OF NEW YORK, N. Y., ASSIGNORS OF ONE-SIXTH TO SELMAN LISS, OF NEW YORK, N. Y., AND ONE-SIXTH TO LEOPOLD TROPP AND ONE-SIXTH TO MORRIS M. TURITZ, BOTH OF BROOKLYN, NEW YORK.

BRAKE FOR VEHICLES.

1,196,724.      Specification of Letters Patent.      Patented Aug. 29, 1916.

Application filed November 14, 1913. Serial No. 801,013.

*To all whom it may concern:*

Be it known that we, MOSES SHERMAN and BERT RIVKIN, citizens of the United States, and residents of New York, in the county of New York and State of New York, have invented certain new and useful Improvements in Brakes for Vehicles, of which the following is a specification.

This invention relates to improvements in brakes for vehicles, and more particularly to positive locks for vehicles, and is adaptable to all styles of wagons, carts, automobiles and so forth.

The object of the invention is to provide a simple and inexpensive means for locking a vehicle to prevent the theft thereof.

The further object is to provide a brake of this kind which will prevent one or more of the wheels from revolving and cause them to drag upon the road bed and thus prevent the vehicle from being easily and quickly transferred from one locality to another, and if a theft is being perpetrated the culprit can be easily overtaken and located by the tracks made by the dragging wheels, and the locked wheel of the vehicle will also indicate, if the vehicle is in motion, that a theft is being committed.

The still further object is to provide a brake of this character which cannot be released by any one except he is provided with the proper key, and to prevent dishonest drivers after leaving the employment of a firm from using a duplicate key which they may have made while in charge of the vehicle.

With these and other objects in view, it will be seen that we accomplish the foregoing, by referring to the accompanying drawings forming a part of this specification and showing one of the principal embodiments of our invention and while we have shown this one principle, we wish it understood that many changes may be made in the various parts and arrangement thereof without departing from the spirit and scope of our invention, and we wish to reserve these rights.

Figure 2:
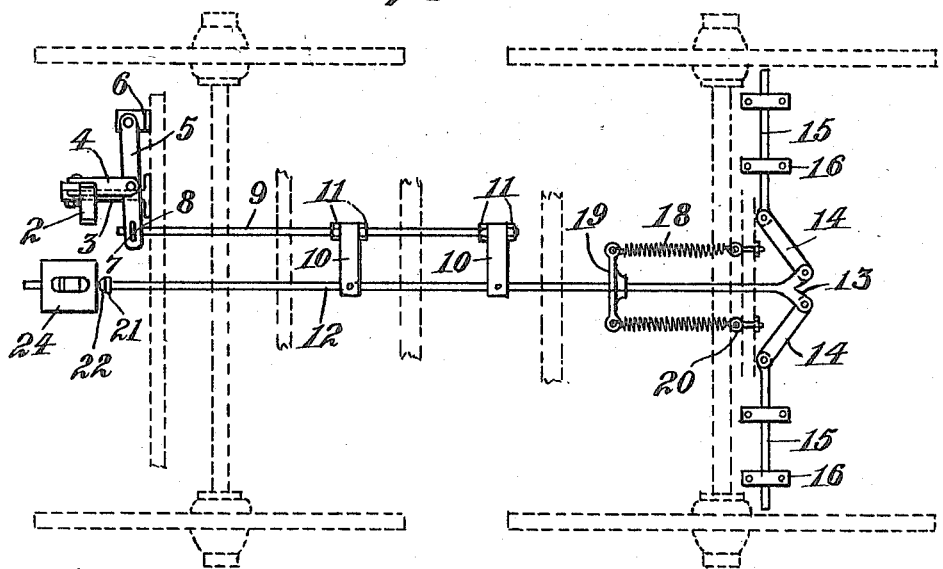

Referring to the accompanying drawings, Figure 1 is a side elevation of one style of delivery wagon partly in section or broken away to more clearly show our invention and how it is applied; Fig. 2 is a plan of our invention as shown in Fig. 1, a portion of the wagon being shown or indicated by dotted lines; Fig. 3 is a top plan of the lock and showing a portion of the locking member; Fig. 4 is a plan of the lock with the upper portion of the casing removed; Fig. 5 is a side elevation, partly broken away and showing almost a true central vertical section; Fig. 6 is a view similar to Fig. 3, but showing the spring plate thrown open and the lock ready for the insertion of the key; Fig. 7 is a bottom plan of the upper portion of the lock casing and showing the retaining means of the spring plate; Fig. 8 is a vertical section taken on the line 1—1 of Fig. 3, looking in the direction of the arrow $a$; Fig. 9 is a top plan of a retaining plate which carries the locking members and key stud and obstruction pins; Fig. 10 is a side elevation of the retaining plate and locking members, and Fig. 11 is a side elevation of the key.

Referring to Figs. 1 and 2, it will be seen that we provide a brake mechanism for a standard make of wagon. The mechanism is operated by the foot of the driver, but can only be released by a key, and consists of a foot lever 2, which is pivoted to a bracket 3 secured to the wagon. The lever 2 is provided with a pivoted link 4, which is connected to the link 5 supported by a bracket 6 secured to the wagon. The lever 5 is provided with a slot 7 in which operates a pin 8 of the operating rod 9, which passes through holes in the cross members of the wagon, which serve as bearings for the rod, or other suitable bearings may be provided. The rod 9 is provided with two transverse members 10, which are held in position by lock nuts 11 with which to adjust the members 10 relatively to the foot lever mechanism and the locking mechanism. The members 10 are pinned to or otherwise secured to the main operating rod 12, which is provided at its rear end with a Y-shaped fork 13, to which are connected two pivoted links 14, and the links are in turn connected to two locking rods 15 and held in position by suitable bearings 16, which are bolted to blocks 17 secured to the wagon. The Y fork 13 and the links 14 form practically a toggle joint which is held in its open position by the springs 18 connected to the cross member 19, (secured to the main operating rod 12), and the eye-bolts 20 secured to the wagon. The front portion of the rod 12 is provided with a locking member 21, comprising a cylindrical member having a conical or tapered end 22 and a locking face 23. Secured to the wagon in any suitable manner is the lock 24, in position for the front end of the main operating rod 12 to pass through and the front plate or side 25 forming a bearing for the rod.

Referring to Figs. 3 to 8, it will be seen that the lock 24 consists of two casings 26 and 27. The bottom casing is provided with a bottom plate 28, through which pass retaining screws 29, which are screwed into the upper casing and pass through the reinforcing plates 30 and the top plate 31 of the lock and are riveted or headed over, thus preventing the lock from being taken apart except by a machinist. The upper casing 26 is held in alinement with the lower casing by the pins 32 of the upper casing being inserted into the holes 33 of the lower casing. The lower casing has at its front end a portion of its top plate 34 bent down, forming a partial wall or partition 35 and dividing the lower casing into two compartments 36 and 37. Passing through the compartment 37 and secured in the partition 35 and the rear wall 38 is a cylindrical tube 39, through which pass the locking members 21 to be engaged by the depending arms 40 of the pivoted arms 41, which are carried on a pivot stud 42 secured in the retaining plate 43. The arms 41 are held in locked position by the springs 44 secured to the plate 34 by the retaining blocks 45 and give additional pressure or retaining force to the arms 41 by abutting the pins 46. The retaining plate 43 is secured to the plate 34 by screws 47, and carries the key stud 48 and obstruction pins 49. Upon the top plate 50 are riveted two plates 51 and 52, in which is located a shaft 53, upon which swings a spring plate 54, (which covers the key hole 55), and is provided with a pair of springs 56 to throw the plate open when the catch 57, which passes through the opening 58, is released by the latch 59, held in position by the spring 60 and operated by the sliding member 61, which is guided by the reinforcing plate 30 and operated by a connecting member 62 passing through a slot 63 in the plate 50 and connecting it to the sliding member 64.

The operation is very simple. When the driver stops his wagon he simply puts his foot upon the lever 2 and it is pushed forward. This causes, through the link 4, the lever 5 to swing on its pivot, drawing the rod 9 forward and also causing the rod 12 to move in the same direction and putting a strain on the springs 18, and at the same time the rear ends of the links 14 are brought forward and almost into line with the rods 15. This movement causes the rods 15 to move in a transverse direction to the rod 12 and in opposite direction of each other, and to have their ends pass between the spokes of the rear wheels of the wagon and prevent the revolving of the same. When the rod 12 moves forward the conical end 22 of the locking member 21 forces the arms 40 apart and the locking member passes into the locking chamber 36 and the arms 40 snap behind the face 23 and hold everything in its locked position. In order to release the rods 15 and allow them to be withdrawn, it is only necessary to push the member 64 in the proper direction, (shown in Fig. 6), and the spring plate 54 will be thrown open, then insert the key 66 into the lock and give it a quarter of a turn and the blades 65 of the key will force the arms 41 apart and this will cause the arms 40 to move from behind the face 23 of the locking member 22 and allow the springs 18 to return all the other parts to their normal positions.

If it is desired at any time to change the combination of the lock for any reason, it can be easily done by simply removing the top casing and then removing the retaining plate 43 by removing the screws 47 and substituting the plate 70 shown in Figs. 9 and 10, which carries arms 71 similar to the arms 41. The arms 71 are cut away at 72 and the notches thus formed make it necessary to have a key with longer blades in order to open the arms 71 sufficiently to release the locking member 22. A further means for changing the combination is the difference of arranging the obstruction pins 74.

We claim as our invention:

1. The combination with a vehicle, of a brake mechanism comprising a pair of plungers mounted to slide endwise and engage two of the wheels to lock against movement, a lock rod mounted to reciprocate, a pair of links connecting said plungers respectively with said rod and arranged to act as a toggle joint device, springs connected with the lock rod to retract it and the plungers when advanced, an actuating lever on the vehicle arranged to shift the lock rod to advance the plungers to engage the wheels, and a key controlled lock device arranged to automatically engage the lock rod when shifted to advance the plungers to locking position with the wheels, whereby the lock rod and plungers are locked in such position, until the lock device is released by its control key.

2. The combination with a vehicle, of a pair of plungers arranged to engage two of the wheels respectively when advanced, a lock rod arranged to reciprocate, means connecting the lock rod with the plungers to reciprocate them by the lock rod, an actuating lever on the vehicle arranged to advance the lock rod and plungers to wheel engaging position, a spring connected with said parts to retract the plungers and lock rod, a key controlled lock device, and a head carried by the lock rod arranged to be engaged by the lock device on advance of the lock rod and plungers, to automatically lock the rod and plungers to engage the wheels, and to hold the parts in said position until released by the key.

Signed at New York in the county of New York and State of New York, this 8th day of Nov., A. D. 1913.

MOSES SHERMAN.
BERT RIVKIN.

Witnesses:
M. ROSENHEIM,
JACOB GUTFELD.

Copies of this patent may be obtained for five cents each, by addressing the "Commissioner of Patents, Washington, D. C."